United States Patent
Kurts et al.

(10) Patent No.: US 11,085,964 B2
(45) Date of Patent: Aug. 10, 2021

(54) SYSTEMS AND METHODS FOR INTELLECTUAL PROPERTY-SECURED, REMOTE DEBUGGING

(71) Applicant: Intel Corporation, Santa Clara, CA (US)

(72) Inventors: Tsvika Kurts, Haifa (IL); Boris Dolgunov, San Jose, CA (US); Vladislav Mladentsev, Cupertino, CA (US); Ittai Anati, Ramat Hasharon (IL); Elias Khoury, Haifa (IL); Maor Kima, Haifa (IL); Eran Shlomo, Haifa (IL); Shay Gueron, Haifa (IL); William Penner, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 16/403,296

(22) Filed: May 3, 2019

(65) Prior Publication Data
US 2020/0348361 A1 Nov. 5, 2020

(51) Int. Cl.
*G01R 31/317* (2006.01)
*G06F 16/22* (2019.01)
(Continued)

(52) U.S. Cl.
CPC ... *G01R 31/31719* (2013.01); *G01R 31/3177* (2013.01); *G01R 31/31705* (2013.01); *G06F 11/263* (2013.01); *G06F 16/22* (2019.01); *H04L 9/0631* (2013.01); *H04L 9/0819* (2013.01); *H04L 9/0894* (2013.01); *H04L 9/321* (2013.01)

(58) Field of Classification Search
CPC ........ G01R 31/31719; G01R 31/31705; G01R 31/3177; G06F 16/22; G06F 11/263; H04L 9/0631; H04L 9/0819; H04L 9/0894; H04L 9/321
See application file for complete search history.

(56) References Cited

U.S. PATENT DOCUMENTS 9,172,701 B2 * 10/2015 Burch .................... G06F 21/00
2007/0055958 A1 * 3/2007 Birenheide ........... G06F 11/362
717/124

(Continued)

OTHER PUBLICATIONS

GOOGLE translation of CN108011883A (May 8, 2018 Publication of CN108011883A, 8 pages) (Year: 2018).*

(Continued)

*Primary Examiner* — Oleg Korsak
(74) *Attorney, Agent, or Firm* — Fletcher Yoder P.C.

(57) ABSTRACT

Systems and techniques of the present disclosure may provide remote debugging of an integrated circuit (IC) device while preventing unauthorized access of device intellectual property (IP). A system may include an IC device that generates an encrypted session key and an interface that enables communication between the IC device and a remote debugging site. The interface may enable the IC device to send the encrypted the encrypted session key to initiate a remote debug process, receive an acknowledgement from the remote debugging session, and authenticate the acknowledgement. Further, the interface may enable to the IC device to initiate a secure debug session between the IC device and the remote debugging site.

17 Claims, 7 Drawing Sheets

(51) Int. Cl.
 *G01R 31/3177* (2006.01)
 *G06F 11/263* (2006.01)
 *H04L 9/06* (2006.01)
 *H04L 9/08* (2006.01)
 *H04L 9/32* (2006.01)

(56) References Cited

U.S. PATENT DOCUMENTS

| | | | | |
|---|---|---|---|---|
| 2012/0131555 | A1* | 5/2012 | Hossain | G06F 11/362 |
| | | | | 717/124 |
| 2015/0127983 | A1* | 5/2015 | Trobough | G06F 11/2733 |
| | | | | 714/30 |
| 2017/0243203 | A1* | 8/2017 | Bond | G06Q 20/3223 |
| 2017/0286254 | A1* | 10/2017 | Menon | G06F 11/364 |
| 2019/0097818 | A1* | 3/2019 | Lu | H04L 9/3263 |
| 2019/0347213 | A1* | 11/2019 | Lutz | G06F 21/602 |

OTHER PUBLICATIONS

Extended European Search Report for EP20163972.3 dated Sep. 24, 2020.

Rosenfeld, K., et al., "Attacks and Defenses for JTAG," IEEE Design & Test of Computers, IEEE Service Center, New York, NY, US, vol. 27, No. 1, Jan. 1, 2020.

Valea Emanuele et al., "Encryption-Based Secure JTAG," 2019 IEEE 22nd International Symposium on Design and Diagnostics of Electronic Circuits and Systems (DDECS), IEEE, Apr. 24, 2019.

IONA Technologies PLC, "iPortal Application Server Developer's Guide," Internet Citation, Oct. 1, 2001, retrieved from: http://www.iona.com/support/docs/iportal_application_server/3.0/DevelopGuide/pdf/ipas30_developguide.pdf.

Amitabh Das et al., "Secure JTAG Implementation Using Schnorr Protocol," Journal of Electronic Testing, vol. 29, No. 2, Apr. 1, 2013.

* cited by examiner

SYSTEMS AND METHODS FOR INTELLECTUAL PROPERTY-SECURED, REMOTE DEBUGGING

BACKGROUND

The present disclosure relates generally to debugging electronic devices, such as integrated circuit devices. More particularly, the present disclosure relates to remote debugging of the integrated circuit device while preventing unauthorized access to intellectual property (IP) stored on and/or utilized in the integrated circuit device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Modern electronic devices, such as computers, portable devices, network routers, data centers, Internet-connected appliances, and more, tend to include at least one integrated circuit device. Integrated circuit devices may take on a variety of forms, including processors (e.g., central processing units (CPUs)), memory devices, and programmable devices (e.g., FPGAs), to name only a few examples. In some instances, the integrated circuit device may not function as intended. To identify and correct errors causing the unintended functionality, the integrated circuit device may be unlocked (e.g., fully accessible) during a debugging process. However, debugging the unlocked integrated circuit device may expose intellectual property (IP) of the device to unauthorized parties, resulting in possible discovery of technology secrets.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Integrated circuit devices may include processors, memory devices, programmable devices, and the like. To facilitate performance and functionality, the integrated circuit device may include intellectual property (IP), such as microcode that controls operations of a core, power management code, logic configuration, integrated circuit device architecture, and the like. Once the integrated circuit device is ready for implementation, the IP (e.g., IP that has elevated permission to access) may be protected (e.g., locked) by a designing party (e.g., INTEL®) to prevent unauthorized access and potential reverse engineering by non-designer parties, such as clients that use the integrated circuit device and/or interceptors that intercept communications with the clients.

In some cases, during testing and/or implementation by the non-designer party (e.g., clients), the integrated circuit device (e.g., System Under Test (SUT)) may not function as intended. To determine the error(s) and/or causes of the error(s), the designing party may perform a debug process that involves analysis of the IP. In such cases, the IP may be unlocked to enable full access of the IP during the debugging process. For example, the designing party may perform a terminal access point (TAP) Unlock that enables the designing party to internally and fully debug the integrated circuit device using a special access key while the integrated circuit device is at the client site.

However, when the integrated circuit device is unlocked, IP information, such as the microcode and the p-code, may be readily accessible by unauthorized, non-designer parties. To reduce or prevent unauthorized access of the IP when debugging the integrated circuit device at the client site, a qualified employee from the designing party may be sent to the client site to protect the unlocked IP. In some instances, the client site may be located in a different country, and sending the qualified employee to such distant sites may add delay to the time used to resolve the error during debug. Further, the qualified employee may not be allowed in the client site, forcing the non-designer party to build an additional dedicated lab for debug, which may be costly and add further delays.

Additionally or alternatively, if the qualified employee fails to resolve the error at the client site within a reasonable amount of time, the integrated circuit device, along with supported ecosystem (e.g., periphery, BIOS), may be shipped to the debugging site for further debugging. This may also increase time required for debugging the integrated circuit device since shipping from the client site to the debugging site may take weeks and because of reduced ability, at the debugging site, to reproduce the error occurring at the client site. For example, the error may not be reproducible at the debugging site for autonomous driving or deep learning implementations. As such, the debug process may force extra investments by the client into the testing process and thus, may delay development progress for the client.

Accordingly, and as further detailed below, embodiments of the present disclosure relate generally to providing remote debugging techniques for an integrated circuit device while preventing unauthorized access of the IP. In some embodiments, a hardware layer of a debugging system may include a client site and a debugging site. The client site may include a system under test (SUT), which may be the integrated circuit device under debug, that further includes a central TAP and an encryption/decryption machine that may encrypt/decrypt information and communicate with the central TAP. The SUT may be coupled to a client site host device via any suitable interface, such as a Joint Test Action Group (JTAG) interface.

In some embodiment, the client-site host device may communicate information between the SUT and the debugging site via a software layer that complements the hardware layer. In particular, the software layer may create a secure channel between the client site host device and the debugging site by transmitting encrypted information over a public network using a Web Socket solution and a relay server. In other words, rather than using individual virtual private networks (VPNs) for each different non-designer party as multiple individual VPNs may be laborious to set up, debug information may be bi-directionally communicated to and from the client site in real-time using the Internet via secure tunneling.

In some embodiments, the remote debug process may be initiated by the non-designer party when a debug request is sent over one or more public networks to the debugging site. Once the SUT and the non-designer party is identified by the debugging site, encrypted JTAG debug commands may be transmitted from the debugging site over the public network to the client site host device and subsequently to the SUT. The JTAG debug commands may be decrypted within the CPU of the SUT using the encryption/decryption machine. The JTAG debug commands may be executed and results may be transmitted back to the debugging site for analysis. The remote debug process may continue until the root cause of the error is identified. In some embodiments, session keys may be used to authenticated, decrypt, and encrypt information communicated during the remote debug process. As such, remote debug process may allow for secure, remote debugging of the remote, unlocked SUT without attendance of the qualified employee at the client site, shipping delays, and error reproduction delays.

Figure 1:
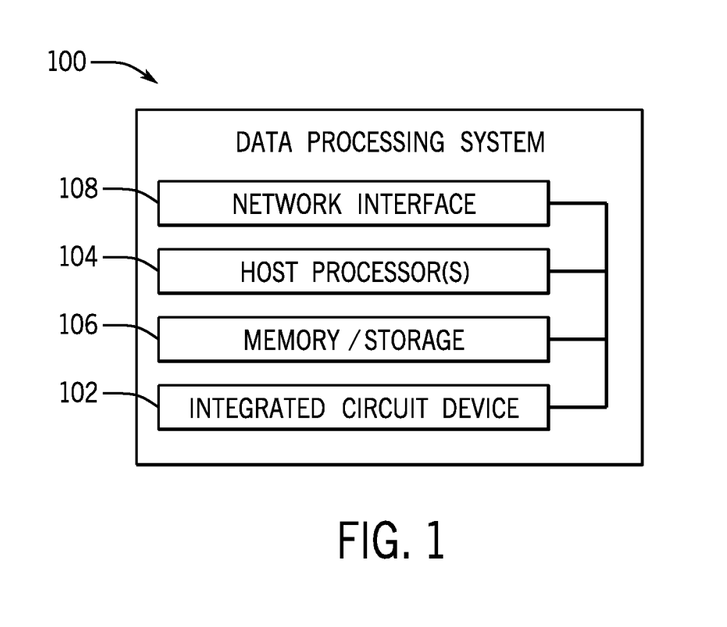
FIG. 1 is a block diagram of a data processing system including an integrated circuit device, in accordance with an embodiment of the present disclosure.

With the foregoing in mind, FIG. 1 is a block diagram of a data processing system 100 including an integrated circuit device 102, in accordance with an embodiment of the present disclosure. The data processing system 100 may include more or fewer components (e.g., electronic display, user interface structures, application specific integrated circuits (ASICs)) than shown. The data processing system 100 may include one or more host processors 104, such as an INTEL® XEON® processor or a reduced-instruction processor (e.g., a reduced instruction set computer (RISC), an Advanced RISC Machine (ARM) processor) that may manage a data processing requests for the data processing system 100 (e.g., to perform machine learning, video processing, voice recognition, image recognition, data compression, database search ranking, bioinformatics, network security pattern identification, spatial navigation, or the like).

The host processor(s) 104 may communicate with memory and/or storage circuitry 106, which may be a tangible, non-transitory, machine-readable-medium, such as random-access memory (RAM), read-only memory (ROM), one or more hard drives, flash memory, or any other suitable optical, magnetic or solid-state storage medium. The memory and/or storage circuitry 106 may hold data to be processed by the data processing system 100, such as processor-executable control software, configuration software, system parameters, configuration data, etc. Additionally, the memory and/or storage circuitry 106 may store instructions that, when executed by the host processor(s) 104, may instruct the host processor(s) 104 how to process the data.

The data processing system 100 may also include a network interface 108 that allows the data processing system 100 to communicate with other electronic devices. In some embodiments, the data processing system 100 may be part of a data center that processes a variety of different requests. For instance, the data processing system 100 may receive a data processing request via the network interface 108 to perform machine learning, video processing, voice recognition, image recognition, data compression, database search ranking, bioinformatics, network security pattern identification, spatial navigation, or some other specialized task. The data processing system 100 may further include the integrated circuit device 102 that performs implementation of data processing requests.

Figure 2:
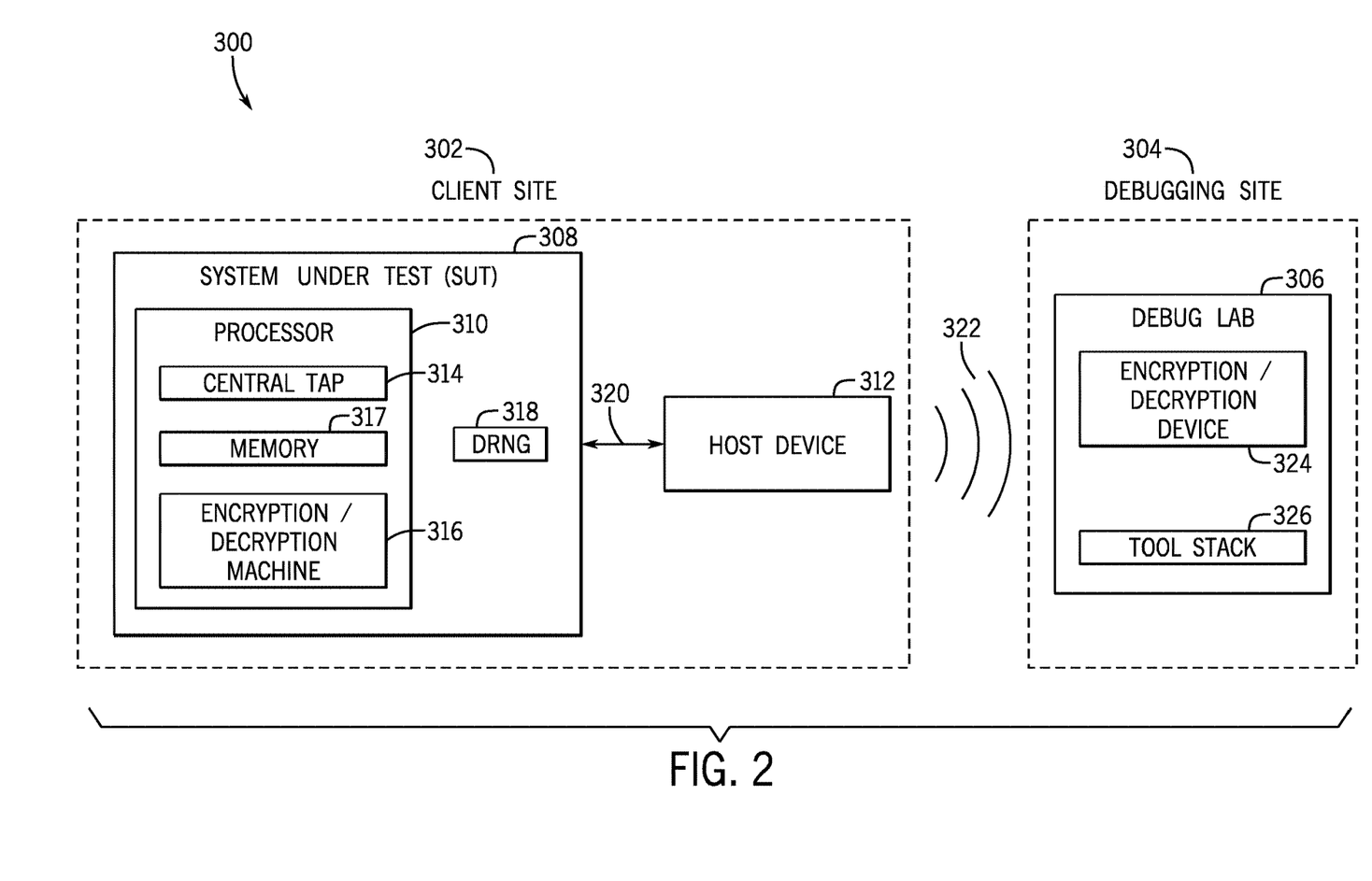
FIG. 2 is a block diagram of hardware layer that facilitates intellectual property (IP)-secured, remote debugging of the integrated circuit device of FIG. 1, in accordance with an embodiment of the present disclosure.

In instances when the integrated circuit device 102 experiences an operation error, the integrated circuit device 102 may be remotely debugged without exposing integrated circuit IP to unauthorized parties. FIG. 2 illustrates a debugging system 300 that performs the remote debug process of the integrated circuit device 102, in accordance with an embodiment of the present disclosure. As shown, the debugging system 300 may include a client site 302, such as a client lab that uses the integrated circuit device 102 for application implementations. Further, the debugging system 300 may include a remote debugging site 304 that includes a debug lab for remotely determining the root cause of the operation error. For example, when the debugging site 304 is located away (e.g., different countries) from the client site 302, the debugging site 304 may remotely assesses (e.g., via public internet connections) the integrated circuit device 102 to determine the root cause of the error.

The client site 302, in particular, may include the integrated circuit device 102 (e.g., in a system under test (SUT) 308) that is under the remote debug process. The SUT 308 may in turn include a processor 310 (e.g., the integrated circuit device 102) that may be debugged by one or more debug labs 306 at the debugging site 304 and/or another location. The debug lab 306 may communicate with the processor 310 via a client-side host device 312 that is communicatively coupled to the processor 310 and to the debugging site 304. To facilitate debugging of the SUT 308, the processor 310 may include a central network terminal access point (TAP) 314 that enables access to/from a network used by the SUT 308. In addition, the SUT 308 may include remote debug IP, such as an encryption/decryption machine 316, a dynamic random number generator 318 used to facilitate the debug process, other IP to be protected in the processor 310, and memory 317 that may store information (e.g., random session key) to facilitate the remote debug process. In some embodiments, the memory 317 may be part of the processor 310 or external to the processor 310.

Briefly, the remote debug process may be initiated by the client using, for example, the client site host device 312 when an unexpected error occurs during testing and/or implementation of the SUT 308 at the client site 302. In such instances, the client may request that the remote debug process be performed on the SUT 308 by the debug labs 306. The request, in particular, may include authorization for performance of the remote debug process by the debug labs 306 and/or a certificate that identifies the client, the SUT 308, the processor 310, and/or other relevant information. The request may be encrypted by the remote debug IP, communicated to the client site host device 312 via a Joint Test Action Group (JTAG) interface 320, and ultimately transmitted to the debugging site 304 from the client site host device 312 over a public network 322.

Once the debug labs 306 verify the client and the SUT 308, JTAG commands may be encrypted by the encryption/decryption device 324 at the debugging site 304 and may be transmitted to the client site host device 312 via the public network 322. The type of JTAG commands sent may be based on the nature of the error. For example, when the error is a hang (e.g., system freeze), a debugger of the debug lab 306 may analyze information on internal node states of the processor 310 and thus, the JTAG commands may include instructions for performing an internal Array Freeze and Dump (AFD) of processor arrays.

The JTAG commands may be transferred from the client site host device 312 to the SUT 308 via the JTAG interface 320. Specifically, the central TAP 314 may receive the encrypted/protected JTAG commands for AFD and/or other interactions and subsequently transfer the JTAG commands to the encryption/decryption machine 316 to decrypt to the JTAG commands using a secure session key, as will be discussed in further detail below. The internal encryption and decryption capabilities provided by the encryption/decryption machine 316 may further protect data transmitted between the debugging site 304 and the client site 302 since unencrypted data may not be exposed to tracking by an unauthorized third party (e.g., hacker) during transfer between the sites 302, 304.

Once decrypted, the remote debug process session may be active and the TAP network may be modified to allow encrypted TAP commands to be passed through to the client site 302 and/or the debugging site 304 while blocking other types of non-encrypted commands. In other words, once the remote debug process session is active (e.g., remote debug SoC state is enabled), a remote debug security policy (e.g., enable debug mode) may be implemented to enable unlocked and/or elevated TAP access of the SUT 308 IP while encrypting data that is input to and/or output from the client site host device, authenticating the client site host device 312, and verifying integrity of TAP commands sent between the debugging site 304 and the client site 302 via the secure session key, as will be discussed below.

The debug function encoded by the JTAG command may be executed by the SUT 308 as if the SUT 308 were located within the debug labs 306 as opposed to the client site 302. For example, the processor 310 may perform the AFD by copying the internal state(s) of SUT array(s) and thus, preserving information about the implementation environment. The encryption/decryption machine 316 may subsequently encrypt this internal state information and transmit this information to the client site host device 312 and to the debug labs 306 via the public network 322. The designer may decrypt the information using the encryption/decryption device 324 and may analyze the internal state(s) using a debug tool, such as a tool stack 326 that gathers stack information during a debug mode. In some embodiments, the remote debug process may continue until the root cause of the error is identified. Additionally or alternatively, the process may pause after the AFD is passed to the debugging site 304 until analysis of the dump is completed. Then, the remote debug process may continue. It should be understood that the term "designer" may include any entity that fabricates or designs the integrated circuit device 102, such that the entity has elevated permission to access IP of the device 102. In some cases, this may be a party responsible for a particular component of the device 102 (e.g., a particular IP module, a particular aspect of a circuit design programmed onto programmable logic of the device 102).

Figure 3:
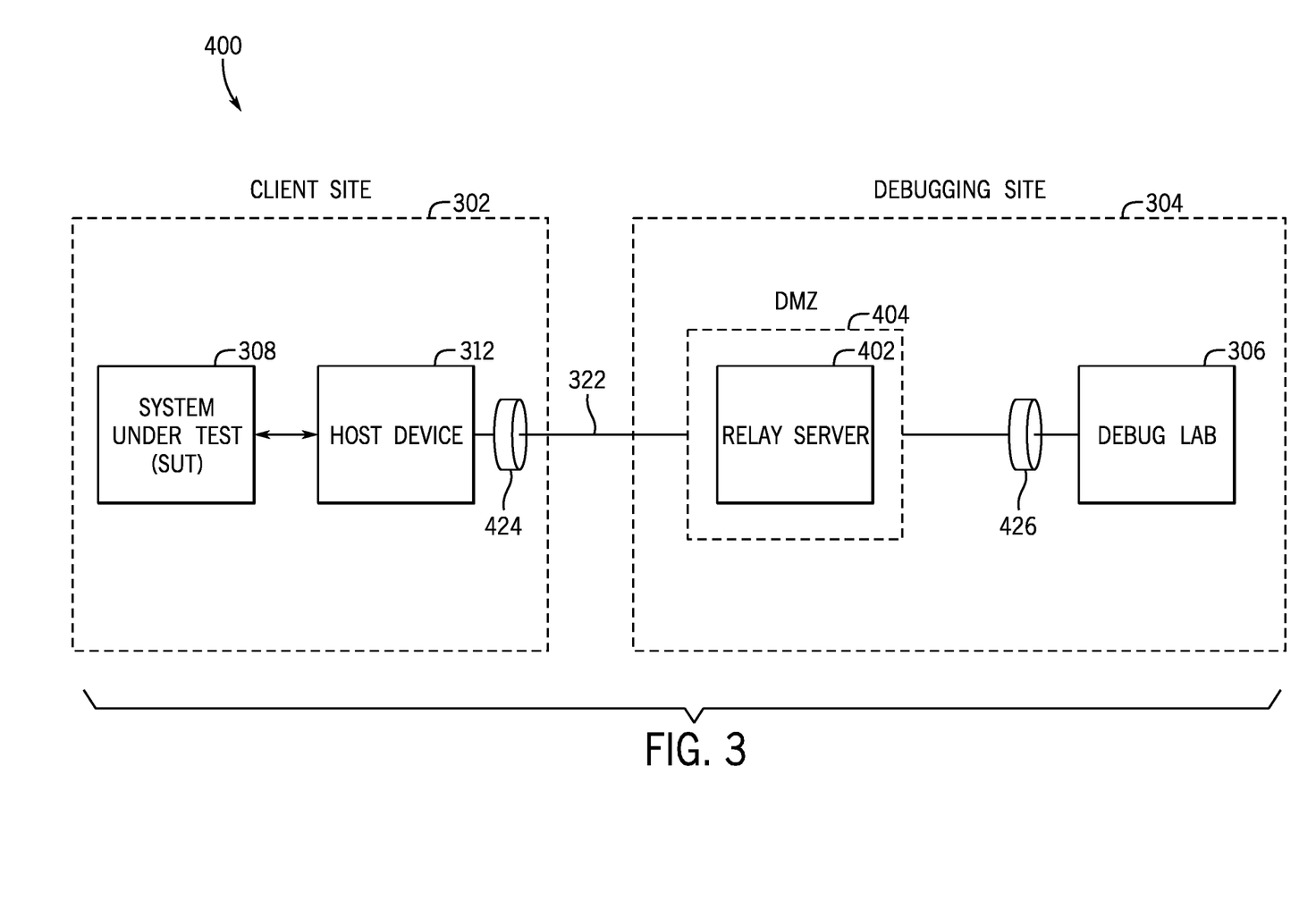
FIG. 3 is a block diagram of software layer that facilitates the IP-secured, remote debugging of the integrated circuit device of FIG. 1 in conjunction with the hardware layer of FIG. 2, in accordance with an embodiment of the present disclosure.

The remote debug process may be further facilitated by a software layer 400 that may aid in implementing the debugging system 300, as shown by FIG. 3 in accordance with an embodiment of the present disclosure. As previously mentioned, to facilitate remote debugging between the client site 302 and the debugging site 304, the information may be communicated between the sites 302, 304 via the public network 322. The software layer 400 may use a Web Socket solution and/or a relay server 402 to create a secure channel between the sites 302, 304, thereby allowing secure and efficient transfer of data while isolating networks at the sites 302, 304 from each other.

For example, communication over the public network 322 may involve an Internet application (e.g., web browser) periodically sending requests (e.g., polling) to a web server in order to receive responses (e.g., messages) from the web server. Polling may generate large amounts of Internet traffic since it may trigger new connections each time a response is received. Some embodiments may utilize bi-directional communication over a single connection (e.g., Web Socket) between the internet application and the web server and may modify the internet application to act as a server. That is, rather than having the Internet application continuously send requests to the web server asking whether the web server has received new messages, the web server may announce to the Internet application that a message has been received without waiting for a request. As such, communication over the public network 322 via the Web Socket solution may improve communication efficiency and speed.

As a further example, the relay server 402 may act as a buffer between the client site 302 and the debugging site 304. When direct connection is not possible between the sites 302, 304 due to security measures (e.g., firewalls) that block synchronization ports, the relay server 402 may be used to set up a demilitarized zone (DMZ) (e.g., perimeter network) 404 that enables data transfer without direct connection between networks of the sites 302, 304. In particular, the relay server 402 may expose select external resources of the client site 302 and of the de bugging site 304 to the public network 322 while restricting (e.g., firewalling) access to the remainder of the client site 302 and of the debugging site 304. As such, the relay server 402 may enable transfer of data between the sites 302, 304 in a secure manner and without using client-specific virtual private networks (VPNs) that may laborious to set up. Although the remote debug process is described using the relay server 402, it should be understood that other connections between the client site 302 and the debugging site 304, such as direct connection, may be used.

In some embodiments, the relay server 402 may be used to create the DMZ 404 as part of a debugging site 304 network and may be selected from multiple available relay servers 402. For instance, the relay server 402 may selected for communication between the sites 302, 304 due to the proximity of the relay server 402 to the client site 302 to further reduce possible latency that may arise due to communication over the public network 322. Additionally or alternatively, the relay server 402 may be selected from the available relay servers 402 according to an amount of latency in communication between the relay server 402 and the client site 302/debugging site 304. Further, the remote debug process may be implemented in conjunction with At Scale Debug (ASD) to enable the debug of the SUT 308 IP.

To enable remote debug process via the software layer 400, the client may open a firewall (e.g., 424) between the client site host device 312 that is coupled to the SUT 308 and a public network gateway on the client site 302. For example, the firewall may be opened 424 to enable the client to access the relay server 402 via HTTP domains (e.g., www, port 80) or HTTPS domains (e.g., port 443). Additionally or alternatively, specific IP address destinations through the firewall may be whitelisted. Furthermore, credentials may be used to bypass the firewall for specific ports/addresses. That is, the client may connect to the relay server 402 using a secured internet website, thereby reducing set-up time and burden on the client. In addition, once the client and SUT 308 have been authenticated using the certificate, the designer may access the same relay server 402 from the other communication end by opening the firewall 426 between the debug lab 306 and the DMZ zone 404. As previously mentioned, by communicating over the public network 322 using the WebSocket solution and the relay server 402, communication via the remote debug process may be secured, accelerated, and reliable while enabling the debugger within the debug labs 306 to interactively debug the SUT 308 located in a different geographic region. In some embodiments, a virtual private network (VPN) may be used in addition to the security techniques discussed herein. However, in some embodiments, the VPN may be omitted to prevent additional work used to establish the remote session and due to problematic nature of establishing VPNs for a potentially large numbers of customers.

Figure 4:
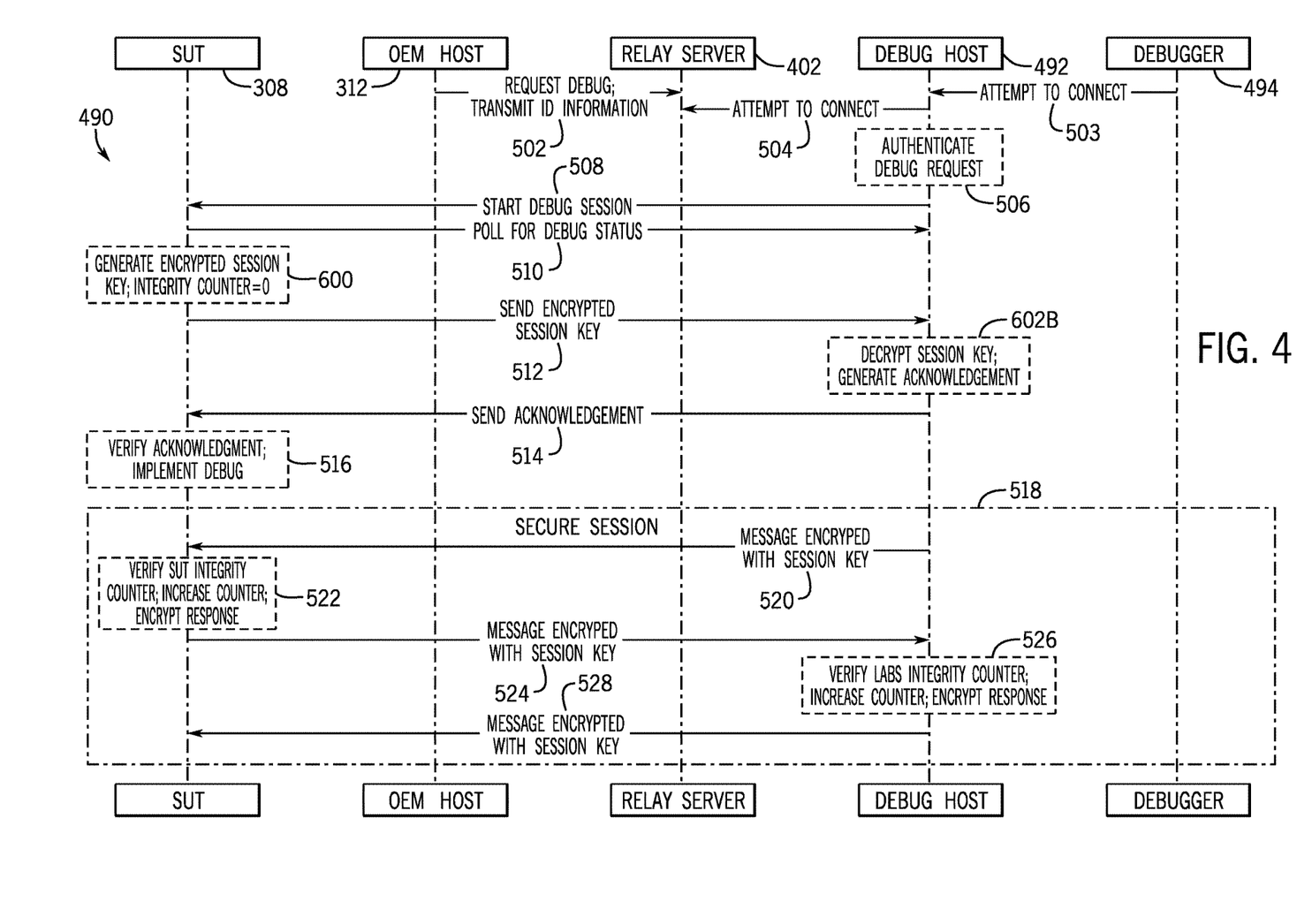
FIG. 4 is a flow diagram of a process for performing the IP-secured, remote debugging of the integrated circuit device of FIG. 1, in accordance with an embodiment of the present disclosure.

Once the client performs a first access to the relay server 402 using the HTTP or HTTPs domain, an authentication and integrity process of remote debug may occur to verify the client and received data. FIG. 4 further details a process 490 for performing the authentication and integrity process, thereby enabling remote debug process of the SUT 308 without exposing IP to unauthorized third parties, in accordance with an embodiment of the present disclosure. As shown, the SUT 308 communicates with the Debugger Lab 306 via the host device 312 (e.g., OEM host device) at the client site 302, the relay server 402, and a debug host 492 at the debugging site 304. The debug host 492 may be any suitable computing device to enable a debugger 494 to debug with the SUT 308 during the debug process.

As previously mentioned, the client may initiate the remote debug process when an error occurs during testing and/or implementation of the SUT 308. In particular, the remote debug IP of the SUT 308 or the client site host device 312 may transmit, via a HTTP/HTTPs domain, a request for remote debug process (process block 502). The remote debug process request may include identification information, such as a certificate with a unique SUT ID, a password specific to the client, consent for debugging (e.g., consent for Delay Authentication Mode (DAM)), and/or the similar information. The relay server 402 may transmit the remote debug process request to the debug labs 306, which may access the relay server 402 from the other side (e.g., other end of the public network channel).

The debugger 494 may also attempt to connect to the SUT 308 via the debug host device 492 (process block 503). The attempt to connect may include credentials (e.g., target name and password provided by the client) to establish a connection with the SUT 308. The attempt to connect may include entry of the credentials or selection of the credentials in the debug host device 492 by the debugger 494. The debug host device 492 then sends a request to connect with the credentials to the relay server 402 (process block 504).

The debug labs 306 (e.g., the debug host device 492 and/or the relay server 402 may verify the identities of the SUT 308 and the client (process block 504). Additionally or alternatively, the debug labs 306 may perform the authentication of the SUT 308 and/or of the client (process block 506). If the SUT 308 and/or the client cannot be verified, the remote debug process may be terminated.

If the SUT 308 and the client can be authenticated, the client may be registered with the relay server 402, and a remote debug process session request may be transmitted to the SUT 308 by the relay server 402 using the Web Socket public network 322 and the JTAG interface 320 (process block 508). The relay server 402 and the debug labs 306 may then wait for confirmation of the request by polling for a status of the remote debug process session and an encrypted session key (process block 510).

Figure 5:
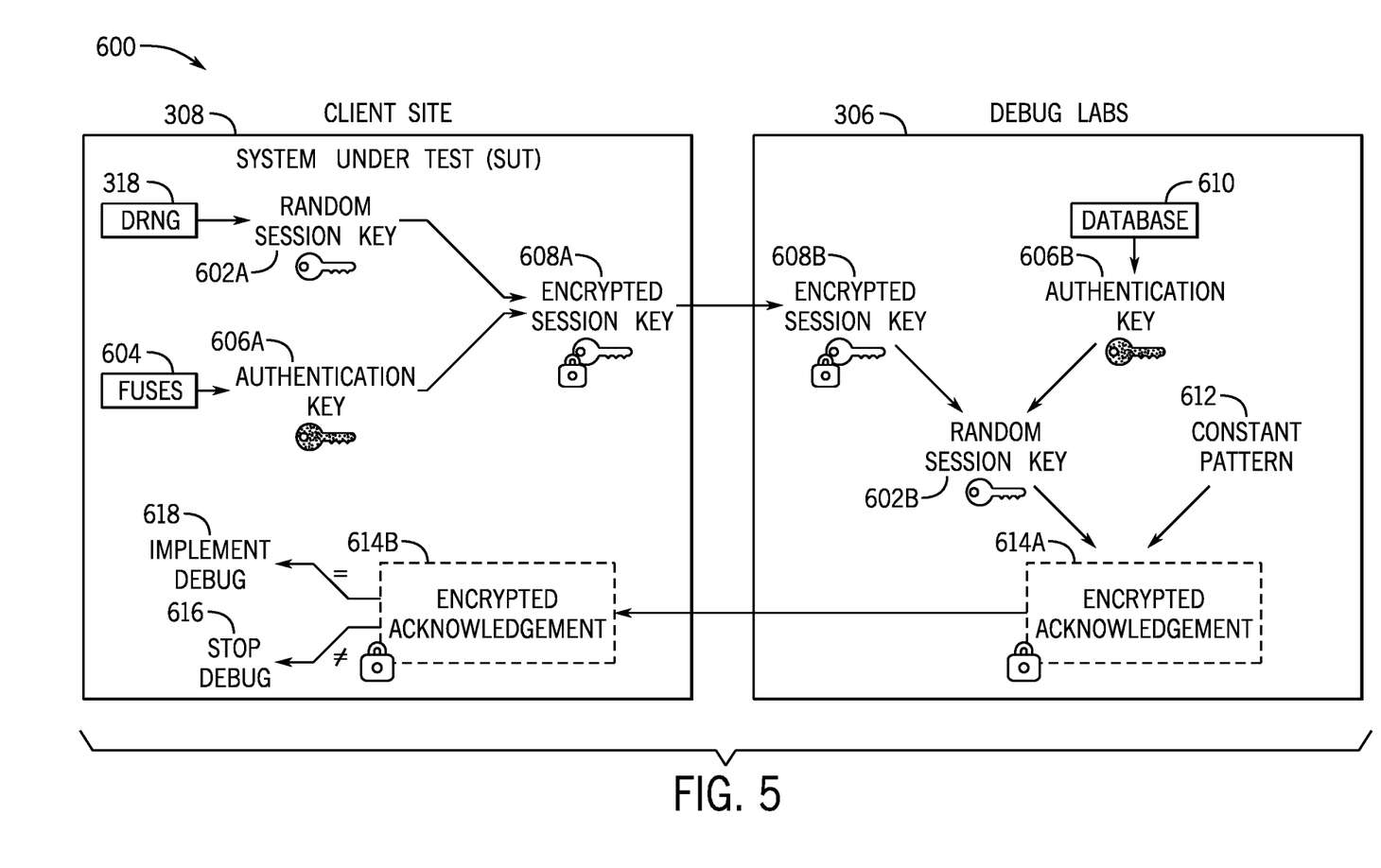
FIG. 5 is a block diagram for performing key exchange of the process of FIG. 4, in accordance with an embodiment of the present disclosure.

Before and/or during this time, the SUT 308 may generate the session key and initialize an integrity counter to zero to ensure security (e.g., data encryption, integrity verification) of the remote debug process, as will be discussed in more detail below (process 600). FIG. 5 illustrates a process 600 for performing the key exchange of process 490, in accordance with an embodiment of the present disclosure. In particular, the SUT 308 may include the dynamic random number generator (DRNG) 318 that generates a random session key 602A for each new session. Because the random session key 602A is generated within the SUT 308, the random session key 602A may not be seen by unauthorized third parties. The SUT 308 may also include fuses 604 that are encoded (e.g., metal strip is melted) with an authentication key 606A during manufacturing of the integrated circuit device 102. The authentication key 606A may be unique to each SUT 308 and may be used to encrypt the random session key 602A. For example, the random session key 602A may be encrypted using Advance Encryption Standard (AES) and a random number of 64-bit length, 128-bit length, or any other variable bit length. Thus, the encrypted session key 608A may be randomized and also have characteristics unique to the SUT 308 to enable future decryption. Additionally or alternatively, in some embodiments, the encrypted session key 608A may be a static key generated by the debug lab 306 and stored within the SUT 308.

Returning to FIG. 4, once the encrypted session key 608A is generated by the SUT 308, the encrypted session key 608A may be transmitted to the debug lab 306 over the public network 322 and via the relay server 402 (process block 512). Once the debug lab 306 receives the encrypted session key 608A, the debug lab 306 may proceed to decrypt the encrypted session key 608A and to generate an acknowledgement that successful decryption occurred.

FIG. 5 illustrates, in more detail, the decryption of the encrypted session key 608B and the generation of the acknowledgement by the debug lab 306. In particular, the debug labs 306 may decrypt the received encrypted session key 608B using a copy of the authentication key 606A (e.g., 606B) that is retrieved based on device-unique characteristics of the SUT 308. As an example, the debugging site 304 may securely store authentication keys (e.g., within an unlock keys database 610) associated with each SUT 308 product. Based on the unique device ID transmitted via the certificate during the authentication process, the debug labs 306 may pull the authentication key 606B that corresponds to the authentication key 606A programmed in the fuses 604 of the SUT 308. Since the authentication key 606A, 606B may not be explicitly transmitted between the sites 302, 304 in an encrypted format, the authentication key 606A, 606B may remain safe from unauthorized third-parties.

Once the debug labs 306 knows the appropriate authentication key 606B, the debug labs 306 may decrypt the encrypted session key 608B. The resulting random session key 602B may then be used to generate an acknowledgement that correct decryption has occurred and the remote debug process may proceed. For example, a constant pattern 612 known to both the debug labs 306 and the SUT 308 may be encrypted using the random session key 602B (e.g., encrypted acknowledgement 614A). The encrypted acknowledgement 614A may then be transmitted to the SUT 308 to verify that a received encrypted acknowledgement 614B is as expected.

If the received encrypted acknowledgement 614B is not of the correct pattern, the remote debug process session may be terminated and connection with the relay server 402 may be dropped. If the received encrypted acknowledgement 614B is of the correct pattern, then the SUT 308 operating state may be changed to enable remote debug process permission for the JTAG interface 320 and restrict commands to only TAP encrypted commands. In other words, direct access to the central TAP 314 may be blocked after successful authentication and only protected, elevated permission TAP commands may be allowed (process block 618). In some embodiments, when the authentication fails, direct access to the central TAP 314 may remain blocked and the remote debug process may be halted and/or terminated (process block 616). Thus, the SUT 308 debugging system 300 and software layer 400 may be set to implement the remote debug process since a secure channel between the sites 302, 304 has been established and verified.

Turning back to FIG. 4, and as described above, the encrypted acknowledgement 614A is transmitted to the SUT 308 (process block 514). The SUT 308 may decrypt the received encrypted acknowledgement 614B and verify that it is of a correct pattern (process block 516). Once the secure channel has been established and verified, the secure debugging session 518 may proceed. During the secure debugging session 518, the debug labs 306 may transmit a message that has been protected using the session key 602B to the SUT 308 via the relay server 402 (process block 520). For example, the debug lab 306 may transmit encrypted JTAG commands signed using the session key 602B for performing AFD and/or other operations to the SUT 308.

In response to receiving the encrypted message, the SUT 308 may subsequently verify the integrity of the received message (process block 522). In particular, each message may include integrity information, such as a command number, which may also be encrypted using the session key 602A when the message is encrypted. For example, a first command packet transmitted to the SUT 308 may have a first command bit number value (e.g., zero) while a second command packet transmitted to the SUT 308 may have a second command bit number value (e.g., one) that is incremented by some value (e.g., one) from the first command bit number value.

The SUT 308 may decrypt the message using the random session key 602A and read the command number. The SUT 308 may verify that the command number matches an expected command number held by an integrity counter within the SUT 308 before continuing execution of the JTAG command. When the command number does not match the expected command number, the sequence of packets may have been changed, in some instances, for malicious purposes. If the command number matches the expected command number held in the integrity counter, the SUT 308 may increment the integrity counter to a value that the next command number is to match.

Further, the SUT 308 may execute the JTAG command to gather information on the internal state of the processor 310 for debugging by the debug lab 306 and/or perform other operations on the processor 310. The information (e.g., response) may then be encrypted using the encryption/decryption machine 316 and the random session key 602A. The SUT 308 may transmit the encrypted information back to the debug lab 306 via the relay server 402 for analysis by the designer in the debug lab 306 (process block 524).

Upon receiving the encrypted information, the debug lab 306 may verify, in a similar manner as the verification performed by the SUT 308, the received encrypted information to determine whether the encrypted information has been compromised (process block 526). In particular, the verification may include comparing a received packet number to an expected packet number held in a packet counter at the debug lab 306. When the received packet number and the expected packet number do not match, the debug secure session 518 may be halted. When the received packet number and the expected packet number match, the encrypted information may be decrypted and analyzed, and the packet counter may be incremented to a value of that the next packet number is to match. The debug lab 306 may generate an appropriate JTAG command, protect the JTAG command (e.g., encrypted then signed with the random session key) with the random session key, and transmit the encrypted version of the JTAG command to the SUT 308 via the relay server (process block 528). In this manner, the remote debug process may continue until the root cause for the error is identified and resolved.

Figure 6:
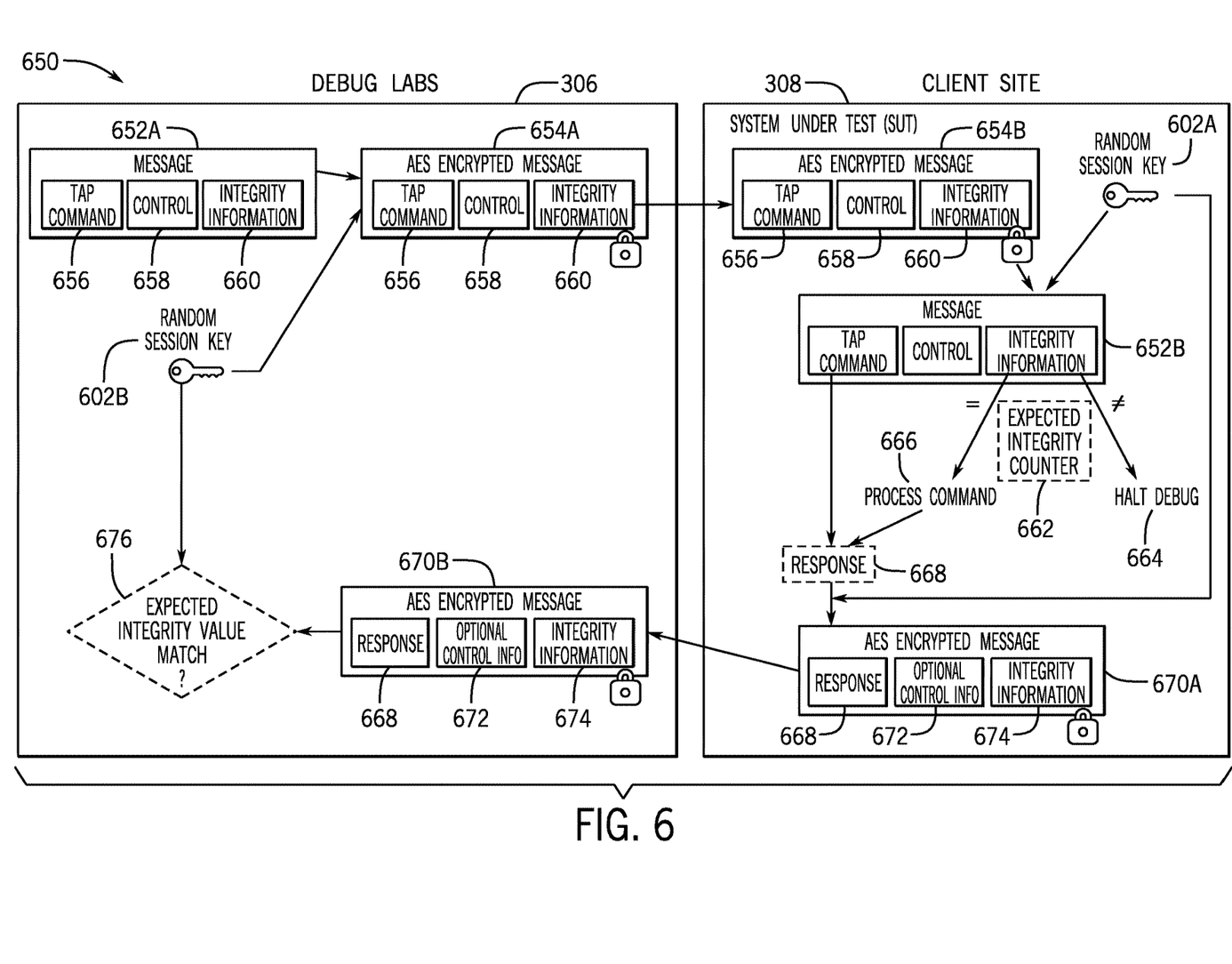
FIG. 6 is a block diagram for transmitting and receiving encrypted messages during the IP-secured, remote debugging of the integrated circuit device of FIG. 1, in accordance with an embodiment of the present disclosure.

FIG. 6 further details protection of data (e.g., JTAG commands, information) during data transfer 650 between the SUT 308 and the debug labs 306 during the secure debug session 518, in accordance with an embodiment of the present disclosure. As previously discussed, the debug labs 306 may generate an AES message 652A upon successful completion of the key exchange. The AES message 652A may include data bits 656 (e.g., TAP commands), control bits 658, and integrity information bits (e.g., command number) 660. In some embodiments, the AES message 652A may be 128 bits in length, of which the data bits 656 may be 80 bits in length, the control bits 658 may be 12 or 16 bits in length, and the integrity information bits 660 may be 36 or 32 bits in length. In certain embodiments, the length of the AES message 652A, the data bits 656, the control bits 658, and the integrity information bits 660 may be any suitable length.

The data bits 656, the control bits 658, and the integrity information bits 660 may facilitate the data transfer during the secure debug session 518. For example, the data bits 656 may include the JTAG command transmitted to the Central TAP 314, the control bits 658 may include information to guide processing of the data bits 656 by the SUT 308, and the integrity information bits 660 may include a value representative of a position (e.g., command number) of the data bits 656 in the sequence of commands transmitted to the SUT 308. As an illustrative example of the integrity information bits 660, a first AES message 652A to be transmitted to the SUT 308 may include integrity information 660 with a first value (e.g., zero), while a second AES message 652A to be transmitted to the SUT 308 may include integrity information 660 with a second value (e.g., one). The debug labs 306 may encrypt the AES message 652A and sign the AES message 652A with the random session key 602B decrypted during the authentication phase to generate an encrypted AES message 654A (e.g., ciphertext) that cannot be deciphered by an unauthorized third party. The encrypted AES message 654A may still include the data bits 656, the control bits 658, and the integrity information bits 660 but in an encrypted form. Once the encrypted AES message 654A is generated, the encrypted AES message 654A may be transmitted to the SUT 308 via the relay server 402.

Upon receiving the encrypted AES message 654B, the SUT may decrypt and validate the encrypted AES message 654A using a local copy of the random session key 602A, thereby re-generating the AES message 652B. Before proceeding with the processing of the AES message 652B, the SUT 308 may verify whether the AES message 652B has been compromised, for example, by an unauthorized third party that is listening to communications between the debug labs 306 and the SUT 308. In particular, the SUT 308 may include an integrity counter within the debug IP that stores an expected integrity information value 662 for an incoming command. For example, when the AES message 652B is the first JTAG command to be received by the SUT 308 in the secure debug session 518, the expected integrity information value 662 may be a first value (e.g., zero). When the expected integrity information value 662 does not match the value of the integrity information bit bits 660, the secure debug session 518 may be halted or terminated (process block 664) as the command sequence may have been scrambled or the AES message 652B may have been tampered with. This verification check may prevent unauthorized third parties from replaying the AES message 652B and other malicious attacks.

When the expected integrity information value 662 matches the value of the integrity information bits 660, the secure debug session 518 may continue by analyzing and processing the TAP command in the data bits 656 (process block 666). The SUT 308 may also generate a response 668 to the TAP command in the data bits 656. For example, when the TAP command in the data bits 656 includes an Array Freeze and Dump (AFD) command, the SUT 308 may generate the response 688 as including information on the internal states of the processor 310. Further, the expected integrity information value 662 stored within the integrity counter of the SUT 308 may be incremented by one in anticipation of receiving the next AES message 652B.

The response 668 may be combined with control information 672 (e.g., which may be optional in some embodiments) and/or integrity information 674 and encrypted and signed using the random session key 602B to generate another AES encrypted message 670A. The control information 672 may be similar to the control bits 658. In some embodiments, the control information 672 may be omitted by sending a value (e.g., zero or null value) in place the control information 672. The integrity information 674 may include a value indicative of the position of the response 668 in a sequence of responses. For example, when the response 668 is the first response to be transmitted to the debug labs 306, the integrity information 674 may store a corresponding value (e.g., zero).

Once the AES encrypted message 670A is received by the debug labs 306, the debug labs 306 may decrypt the AES encrypted message 670A to re-generate the AES message. Before processing the response 668, the integrity information 674 may be compared to an expected integrity value stored in an integrity counter of the debug labs 306 (process block 676). When the expected packet number value does not match the integrity information 674, the secure debug session 51 may be halted or terminated. In some embodiments, when the integrity counter experiences an overflow (e.g., maximum number that can be stored in the integrity counter is crossed) due to, for example, a large amount of responses 668 being received, the current secure debug session 518 may terminate until a re-boot and reset of the integrity counters is performed.

When the expected packet number value matches the packet number information 672, the response 668 may be analyzed. The secure debug session 518 may continue with the debug labs 306 transmitting another AES message 652A with a JTAG command to the SUT 308 based on the response 688. Further, the integrity counter of the debug labs 306 may be incremented in anticipation of the receiving the next response 668. For example, the integrity counter of the debug labs 306 may be incremented to one. In other words, both the SUT 308 and the debug labs 306 may include counters used for incoming and outgoing messages. In some embodiments, a first counter may be used for incoming messages while a second counter is used for outgoing messages. Each counter may be incremented after transmission of a corresponding message. For example, the outgoing message counter may be incremented after a current message is transmitted, and the incoming message counter may be incremented after each new message is received. A single counter may be used if each JTAG command has a corresponding response. In other words, each message from the debug labs 306 invokes a response from the SUT 308 causing the incoming counter and the outgoing counter to match for each pair of communications between the debug labs 306 and the SUT 308.

To summarize, the random session key 602A, 602B and the authentication key 606A, 606B may be used to authenticate, decrypt, and encrypt information communicated during the remote debug process, thereby further securing the remote debug process. For example, when an unauthorized third party is listening (e.g., tracking signals) to communications between the client site 302 and the debugging site 304, the unauthorized third party may only see the encrypted information and the encrypted session key 608A, 608B, both of which cannot be decrypted without the authentication key 606A, 606B. Further, because integrity counters may be used at each site 302, 304 to verify the integrity of the AES message 652A, 670A, anytime the AES message 652A, 670A is transmitted via the relay server 402, the AES message 652A, 670A may be verified to ensure no data tampering has occurred.

In addition, because the random session key 602A, 602B may be re-generated with each new session and/or in the middle of sessions to prevent the unauthorized party from recovering sensitive information. For instance, the random session key 602A, 602B may be re-generated when the processor 310 voltage decreases for power management (e.g., lower power state). Additionally or alternatively, the random session key 602A, 602B may be stored within the memory 317 when power is removed, for example, from the remote debug IP of the SUT 308.

Moreover, because incrementing integrity counter is an integral part of each encrypted JTAG command, the integrity counter may prevent any unauthorized third party from replaying a secure debug session communication that uses old (e.g., unincremented) command bit number values and session keys. As such, the debugging system 300 and the software layer 400 may work together to enable secure, remote debugging of the unlocked and remote SUT 308 without attendance of the qualified employee at the client site 302, ship delays, error reproduction delays.

Figure 7:
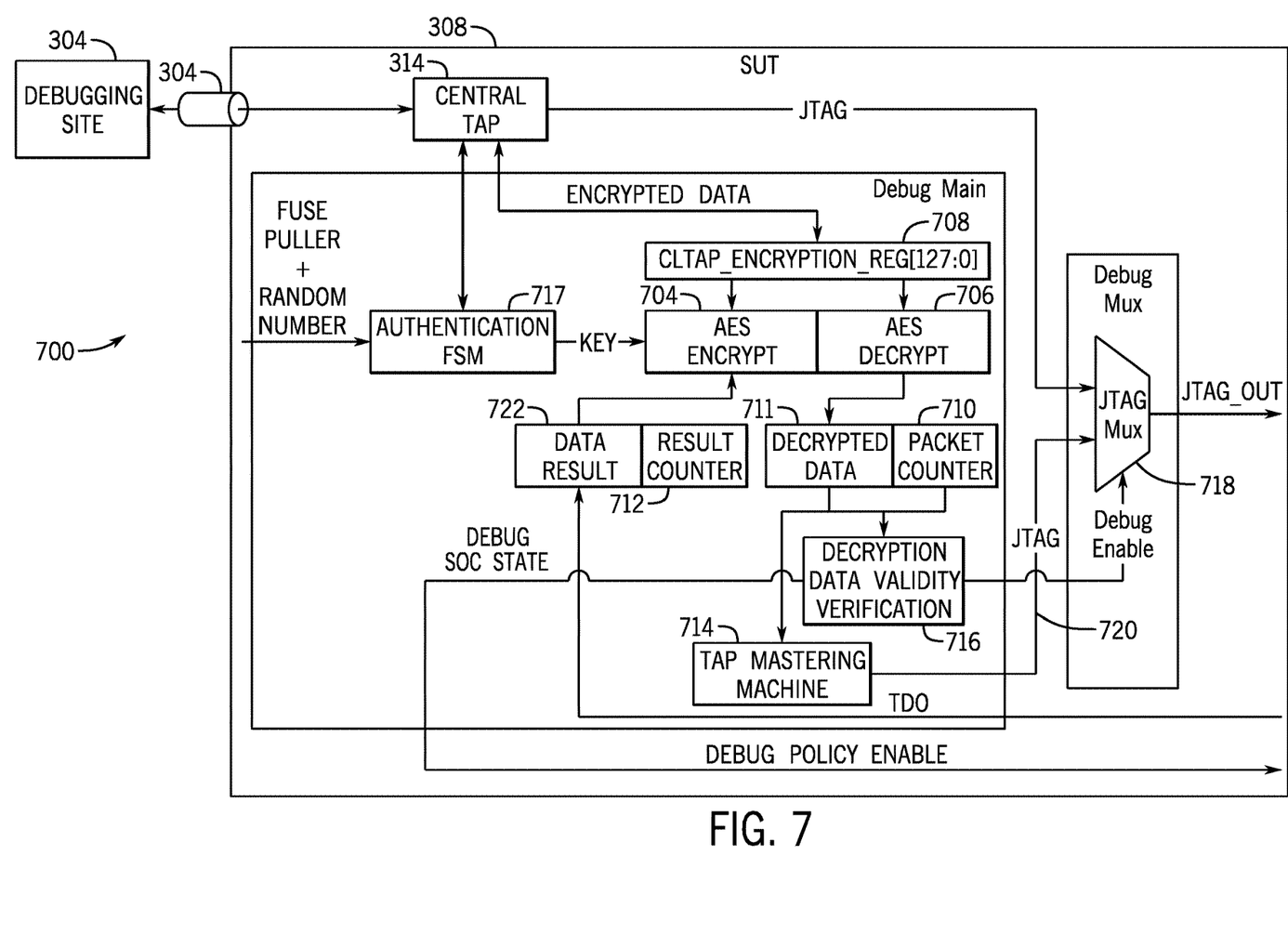
FIG. 7 is a block diagram of architecture used to facilitate the process of FIG. 4, in accordance with an embodiment of the present disclosure.

To further illustrate how the debugging system 300 and the software layer 400 complement each other to perform the remote debug process. FIG. 7 depicts the microarchitecture 700 of the SUT 308 used to facilitate the remote debug process, in accordance with an embodiment of the present disclosure. As shown, the remote debug IP portion of the SUT 308 may include an authentication finite-state machine (FSM) 702, an AES encryption machine 704, an AES decryption machine 706, the Central TAP 314, a TAP encryption register 708, a packet counter 710, a result counter 712, a Fuse Puller and SB-EP (Side Band End-Point) TAP Mastering Machine 714, and a data verification block 716. These components may control remote debug process behavior, evaluate debug status information, and perform the remote debug process.

The microarchitecture 700 may first facilitate the remote debug process by generating the encrypted random session key 608A and by enabling transmission of serial blocks of command. In particular, an authentication FSM 717 may read data from the Central TAP 314, the authentication key 606A, 606B from the fuses 604, and a random number (e.g., random session key 602A) generated by the dynamic random number generator 318. When the client requests the start of a remote debug process session, the authentication FSM 717 may generate the new encrypted random session key 608A based on the authentication key 606A, 606B and the random number. Once the encrypted random session key 608A is generated and transmitted to the debug lab 306, software of the debug lab 306 may encrypt TAP instructions using the random session key 602B and send them to the SUT 308 as an input to the Central TAP 314 and the TAP encryption register 708. Thus, the encrypted TAP instructions may set-up implementation of the remote debug process session.

The encrypted TAP instructions and/or other data may be decrypted using the AES decryption machine 706. In particular, the input data may be decrypted using the random session key 602A, which may be unique for every new remote debug process session and SUT 308. The decryption may be designed such that decryption is complete before another TAP instruction is shifted into the TAP encryption register 708. In some embodiments, the remote debug process may modify different clocks and operating frequencies of the debugging system 300 to meet timing demands of the decryption.

After decryption, the packet counter 710 may perform integrity checks of each decrypted data 711 to prevent unauthorized access by third parties. Each packet may include the data and a counter, as described above. During the remote debug process session, the first packet received should have a counter value equal to an initial value (e.g., zero) and each subsequent packet received should have a counter value that is incremented. Thus, the data verification block 716 may verify that the packet counter values match the internal packet counter 710 value and may ensure that the random session key 602A is valid. Because of the incrementing counter values and because the random session key 602A is unique for each session, the integrity check may prevent save and replay attacks by the third party as well as modification of the command data stream.

Once checks of the decrypted data 711 have been performed, the decrypted data 711 may be sent to the TAP mastering machine 714. In particular, the AES decryption machine 706 may provide the decrypted data 711 in parallel to the busses and subsequently, to the TAP mastering machine 714. In some embodiments, the central TAP 314, however, may use a serial interface for proper functionality. To convert from parallel to serial data transfer, the TAP mastering machine 714 may use an IEEE standard for serial TAP protocol. Further, the TAP mastering machine 714 may provide data width conversion between the TAP instruction widths and the widths supported by the TAP registers of the central TAP 314. From the TAP mastering machine 714, the decrypted data 711 may be transferred to a remote debug mux 718 via a JTAG interface 720. The remote debug mux 718 may select appropriate drivers for the TAP network, such as selecting the remote debug process mode after the decrypted data 711 passes the validity verification. At this point, the remote debug process session may begin.

In some embodiments, the AES machine may also include an AES encryption machine 704 that encrypts data results 722 for transmission to the debugging site 304. For example, the data results 722 may include the information on the internal state(s) of the processor 310. The data results 722 may run through the result counter 712 that may add counter bit number values to each packet of the data result 722. Once encrypted by the AES encryption machine 704, the data result 722 may be transmitted to the TAP encryption register 708, to the central TAP 314, through the secure channel built on the public network 322, and finally to the debugging site 304 for analysis.

The present systems and techniques relate to embodiments for remote debugging of the remote, unlocked SUT 308 while preventing unauthorized access of the SUT IP. The present embodiments may provide scalable remote debugging with reduced debugging turn-around time. Further, the present embodiments may allow debugging of SUT 308 errors with the same debugging tools as those used in debugging site internal debugging, but with access to client environment in which the error occurred.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]" or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
an integrated circuit device;
an interface that enables communication between the integrated circuit device and a remote debugging site, wherein the interface enables the integrated circuit device to communicate comprising:
sending an encrypted session key in a remote debug process;
receiving an acknowledgement from the remote debugging site, wherein the acknowledgement is encrypted based at least in part on a session key derived from the encrypted session key;
authenticating the acknowledgement; and
in response to authenticating the acknowledgement, initiating a secure session between the integrated circuit device and the remote debugging site, wherein messages sent to the remote debugging site via the interface during the secure session are encrypted via the encrypted session key, wherein the interface comprises a random number generator that generates the session key, wherein the random number generator generates a new session key for each remote debug session.

2. The system of claim 1, comprising a client-side host device coupled to the integrated circuit device and to the interface, wherein the client-side host device:
receives accepted incoming messages from the interface, wherein the accepted incoming messages comprise the incoming messages having an encrypted Joint Test Action Group (JTAG) command;
blocks at least a portion of incoming messages that are not the encrypted JTAG commands associated with the remote debug process; and
transmits each incoming message comprising the encrypted JTAG command to a central terminal access point (TAP) of the integrated circuit device using a JTAG interface coupled between the client-side host device and the integrated circuit device.

3. The system of claim 2, wherein the client-side host device continues blocking the at least a portion of the incoming messages that do not include the encrypted JTAG commands after the remote debug process is terminated.

4. The system of claim 2, wherein the central TAP provides a communication channel into the integrated circuit device from the interface.

5. The system of claim 1, wherein communication between the integrated circuit device and the remote debugging site occurs over a public network using a Web Socket implementation.

6. The system of claim 5, wherein the interface enables the integrated circuit device to communicate comprising:
requesting the remote debug process;
receiving a certificate from the integrated circuit device; and
opening a port in a firewall associated with the public network on an integrated circuit device side, wherein the port enables communication with the remote debugging site.

7. The system of claim 6, wherein the certificate comprises a client-specific password, an identification of the integrated circuit device, and a request to initiate the remote debug process.

8. The system of claim 1, wherein authenticating the acknowledgement comprises securely transmitting the session key and authenticating a pattern known to the integrated circuit device and the remote debugging site.

9. The system of claim 1, wherein the messages sent to the remote debugging site comprises an integrity counter, wherein the integrity counter is incremented based on a number of the messages that are sent to the remote debugging site via the interface, and wherein incoming messages received by the integrated circuit device via the interface are authenticated based at least in part on the integrity counter.

10. The system of claim 1, wherein the integrated circuit device comprises:
an authentication finite state machine (FSM) that generates the encrypted session key based on the session key and an authentication key received by the authentication FSM;
an encryption/decryption machine that:
generates encrypted data based on an output of the authentication FSM; and
deciphers encrypted Joint Test Action Group (JTAG) commands received at the integrated circuit device via the interface;
a result counter coupled to an encryption portion of the encryption/decryption machine, wherein the result counter adds an integrity counter packet used by the remote debugging site to verify authenticity of the encrypted data; and
a packet counter coupled to a decryption portion of the encryption/decryption machine, wherein the packet counter verifies authenticity of received JTAG commands.

11. The system of claim 10, wherein the authentication FSM remains on while the encryption/decryption machine is at least partially powered down in response to the remote debug process not being enabled, the integrated circuit device being set to a lower power state, or a combination thereof.

12. The system of claim 10, wherein the encryption/decryption machine generates the encrypted data and decipher the encrypted JTAG commands using an advanced encryption standard (AES) key.

13. The system of claim 10, wherein the authentication key is stored in a database indexed using an identification of the integrated circuit device, and wherein the database is associated with the remote debugging site.

14. The system of claim 1, wherein the random number generator generates the new session key in response to voltage reducing in at least a portion of the integrated circuit device.

15. The system of claim 1, wherein the interface couples to a relay server coupled between the integrated circuit device and the remote debug site.

16. The system of claim 15, wherein the relay server buffers the integrated circuit device and the remote debug site prevent direct communication between the integrated circuit device and the remote debug site.

17. A method for debugging an integrated circuit device via a debug lab, comprising:

verifying, at the debug lab, a request for a remote debug process of an integrated circuit device located at a remote site and received from an interface at the remote site;
authenticating, at the debug lab, the request for the remote debug process;
polling, at the debug lab, for a status of the remote debug process;
receiving, at the debug lab, the status of the remote debug process, wherein the status comprises an encrypted session key generated by the integrated circuit device and an initialized integrity counter;
decrypting, at the debug lab, the encrypted session key to generate a session key;
verifying that the session key matches an expected session key;
in response to the session key matching the expected session key, transmitting an encrypted acknowledgement to the integrated circuit device including the initialized integrity counter to initiate the remote debug process;
in response to the initiation of the remote debug process;
transmitting encrypted Joint Test Action Group (JTAG) commands to the integrated circuit device based at least in part on the session key derived from the encrypted session key; and
receiving encrypted information on internal states of integrated circuit device arrays.

\* \* \* \* \*